Oct. 27, 1964 C. E. JOHNSON Re. 25,668

VINE REMOVER FOR POTATO DIGGERS

Original Filed March 6, 1961 4 Sheets-Sheet 1

INVENTOR.
Carl E. Johnson
BY Wells & St. John
Attys.

VINE REMOVER FOR POTATO DIGGERS

Original Filed March 6, 1961 4 Sheets-Sheet 2

INVENTOR.
Carl E. Johnson
BY
Wells & St. John
Attys.

VINE REMOVER FOR POTATO DIGGERS

Original Filed March 6, 1961 4 Sheets-Sheet 3

INVENTOR.
Carl E. Johnson
BY
Wills & St. John
Attys.

VINE REMOVER FOR POTATO DIGGERS

Original Filed March 6, 1961 4 Sheets-Sheet 4

INVENTOR.
Carl E. Johnson
BY Wells & St. John
Attys.

United States Patent Office

Re. 25,668
Reissued Oct. 27, 1964

25,668

VINE REMOVER FOR POTATO DIGGERS

Carl E. Johnson, Rte. 3, Blackfoot, Idaho

Original No. 3,112,753, dated Dec. 3, 1963, Ser. No. 93,687, Mar. 6, 1961. Application for reissue Mar. 5, 1964, Ser. No. 360,787
3 Claims. (Cl. 130—30)

Matter enclosed in heavy brackets [ ] appears in the original patent but forms no part of this reissue specification; matter printed in italics indicates the additions made by reissue.

This invention relates to a novel structure used in the vine removing apparatus of a potato digger of the type disclosed in my prior patent, No. 2,828,825, issued April 1, 1958, for Potato Harvester Conveyors. In this type of digging machine, the potatoes and vines are first dug by a digger point and forced to an elevating conveyor. The vines and potatoes are agitated between elevating conveyor and an overlapping draper conveyor. The elevating conveyor carries the potatoes to a cross conveyor, while the draper extends upwardly parallel to a vine stripping conveyor which grasps the vines and discharges them.

A problem often arises near the top end of the elevating conveyor due to rocks or large matted accumulations of vines. Rocks are a particularly difficult problem since they cannot yield when forced between the conveyor bearing pulleys and often result in damaged conveyors or pulleys. Should the rock pass beyond the end of the elevating conveyor, it then is subject to the wedging action of the vine removing conveyor and often breaks the projecting fingers from this conveyor or jams the entire conveyor assembly.

It is a first object of this machine to eliminate the damage to the conveyors by pivotally mounting the upper draper bearing supports to enable rocks or other impediments to pass beneath the bearing supports without damaging the conveyors or interfering with the operation of the machine.

It is another object of this invention to provide an offset pivotal connection between the main conveyor frame and the vine remover frame so as to allow the vine remover frame to swing outwardly from the main conveyor frame when a solid object becomes engaged on the vine remover conveyor. The vine remover is to be held in its normal position by gravitation forces only, so as to be instantly adaptable to any change in the thickness of the vines or objects received thereon. The vine remover is mounted so as to be in continual operational position regardless of the inclusion of thick or rigid masses between it and the draper conveyor.

These and further objects will be evident from a study of the following disclosure and the accompanying drawings, which show one form of the invention as applied to an existing potato harvester. This specific form is merely exemplary of the invention and is not intended to limit the field of the invention defined in the annexed claims.

Figure 1:
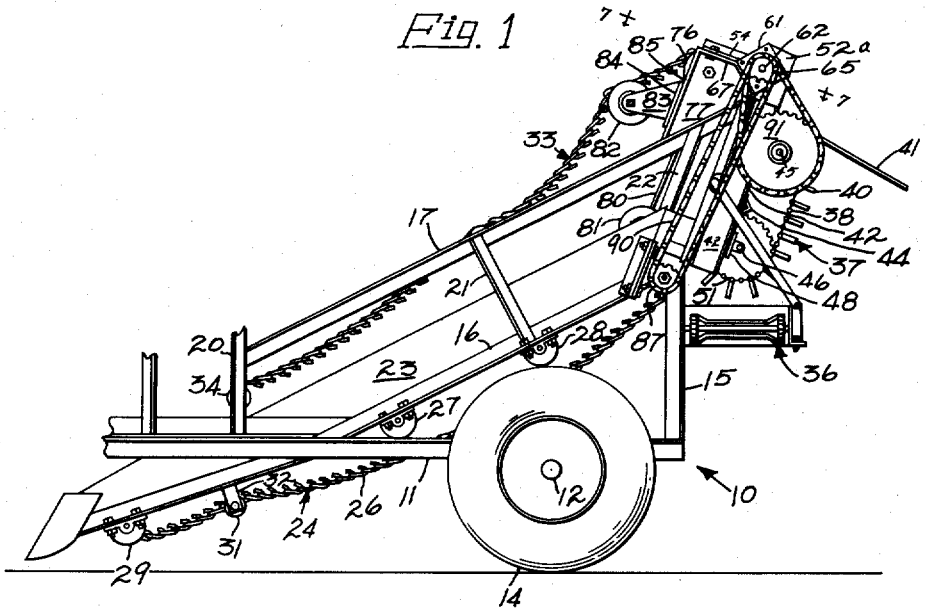
FIGURE 1 is a side view of the conveyor system of the harvester.

Referring now generally to FIGURES 1–4, this invention is shown applied to a potato harvesting machine such as that described in Patent No. 2,828,825 cited above. This machine utilizes a rigid main frame 10, including a pair of laterally spaced longitudinal angle irons 11. These angle irons 11 support a main axle 12 carried by supports 13. Wheels 14 on axle 12 are ground engaging wheels for transport of the machine. The angle iron 11 has fixed thereto a vertical brace 15 which supports a pivoted assembly including a longitudinal angle iron 16, a parallel angle iron 17, connecting angle irons 20, 21 and 22, and vertical side plates 23. The exact configuration of this assembly is unimportant to the instant invention.

An elevating conveyor 24 has an upper flight 25 supported by guides 29, 27, 28 and drive sprocket 30, each journalled on shafts supported between side plates 23. The lower flight 26 of conveyor 24 is free, except that it passes over a guide roller 31 journalled on a short extension 32 below plates 23.

Mounted directly above the elevating conveyor 24 is a draper conveyor 33. The draper conveyor 33 is supported by a drive sprocket 34 journalled between the connecting irons 20 and spaced upwardly from flight 25 of conveyor 24. The lower flight 35 of draper conveyor 33 rests on the upper flight 25 of conveyor 24. The remainder of draper conveyor 33 will be explained below.

The preceding description provides the background for this invention and is related to the potato harvester described in the above-cited patent. The conveyor configurations are identical to those described in this earlier patent, consisting of cross links designed to carry potatoes and vines to an elevated loading position at the upper end of conveyor 24. At this point the potatoes have been separated from the vines by the rubbing action of draper conveyor 33 and the potatoes drop on a cross-conveyor 36 mounted on frame 10. The vines are caught by a vine removing conveyor 37 consisting of a series of laterally spaced chains 38 having perpendicular teeth 40 designed to become entangled in the vines. The vines are then carried upward along conveyor 37 to interspaced stripping plates 41, which strip the vines from teeth 40 and dump them where desired.

In earlier models, the vine carrying conveyor 37 was fixed to frame 10. As will be described, the draper conveyor 33 extends upwardly parallel to the conveyor 37. The earlier models also utilized a fixed guide roller for the draper conveyor 33 directly adjacent the upper end of conveyor 24. These fixed elements caused difficulty whenever a rock or other solid obstacle was unearthed by the machine and carried upwardly on the conveyor 24. Such an object often caused a jam at the upper end of flight 25, sometimes damaging one or both of the conveyors 24, 33 and their supporting elements. If the object did pass under the conveyor 33, it then became wedged between the steeply inclined portion of the draper conveyor 33 and the vine removing conveyor 37. Often this bent the teeth 40 or broke them from the conveyor 37. Such damage was far from unusual.

In order to prevent such damage, the present invention provides a yieldable support assembly for conveyors 33, 37 so as to allow these conveyors to separate under the force of solid objects. The conveyor 37 is mounted on an auxiliary frame comprised of two parallel channels 42, 43 which are rigidly connected by a cross bar 44.

The channels 42, 43 rotatably carry two conveyor shafts 45, 46 by means of a bearing blocks 47, 48 respectively. The shafts 45, 46 have mounted thereon sprockets 50, 51 respectively, over which the chains 38 are drivingly trained.

Figure 7:
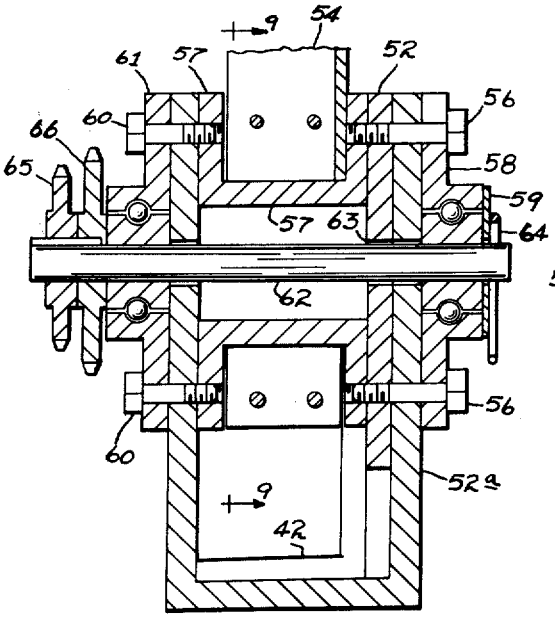
FIGURE 7 is an enlarged fragmentary sectional view of one pivotal support for the vine remover, taken substantially along line 7—7 of FIGURE 1.
Figure 8:
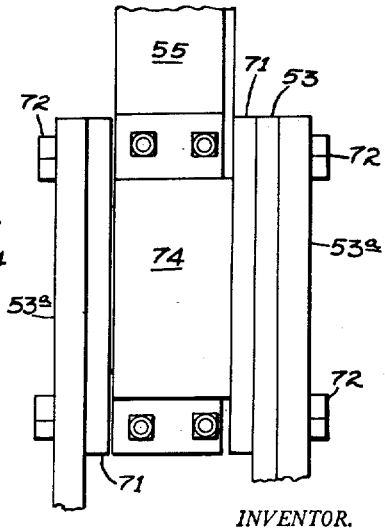
FIGURE 8 is a fragmentary plan view of the other pivotal support from the vine remover.
Figure 9:
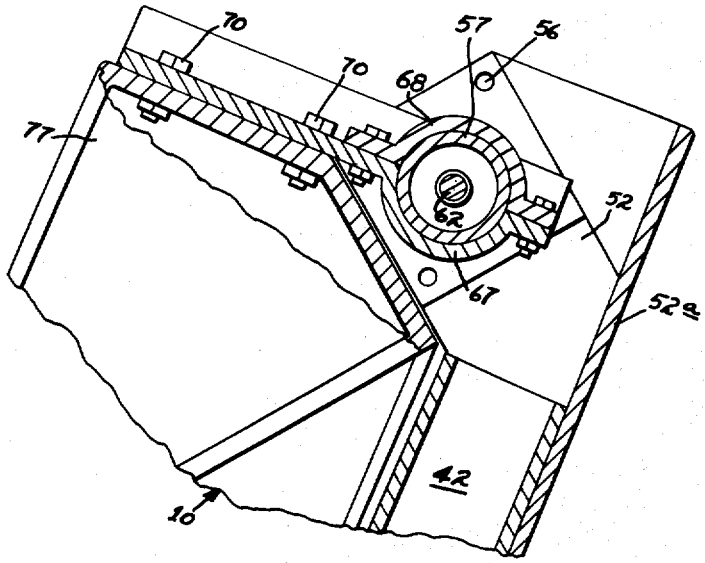
FIGURE 9 is a view taken substantially along line 9—9 of FIGURE 7, showing the side of the pivotal support on a slightly reduced scale.

The top ends of channels 42, 43 are carried by members 52 and 53 that extend up and forwardly toward the front of the machine. These members 52 and 53 are reenforced by channels 52a and 53a and they are supported to swing on the upper ends of angle irons 17. These angle irons have bracket supports 77 to which brackets 54 and 55 are bolted. As seen in FIGURES 7 and 9 the member 52 is bolted by bolts 56 to the flanges of a flanged sleeve 57. Sleeve 57 and *the* bolts 56 also mount an inboard ball bearing assembly 58. Bolts 60 mount an outboard ball bearing assembly 61 on the sleeve 57. The bearing assemblies 58 and 61 rotatably support an idler shaft 62 used to drive the conveyor 37. The shaft 62 passes through apertures 63 cut into the members 52 and 52a, and is secured at its inboard end with a washer 59 and cotter pin 64. The outboard end of shaft 62 has keyed thereto a pair of sprockets 65 and 66. The sleeve 57 is pivoted in a semi-circular portion 67 of the bracket 54 and is held therein by a strap 68 secured to the bracket 54. The bracket 54 is bolted to the support 77 by bolts 70. The position of the vine remover with respect to the conveyors 24 and 33 can thus be varied by changing the position of the brackets 54 and 55 on the supports 77.

The member 53 on channel 43 is secured to an outwardly extending flange sleeve 71 by means of bolts 72. The sleeve 71 is pivotally mounted in a semi-circular portion of bracket 55 and is held therein by a strap 74. The bracket 55 is bolted to its support 77 in the same manner as the bracket 54.

Figure 3:
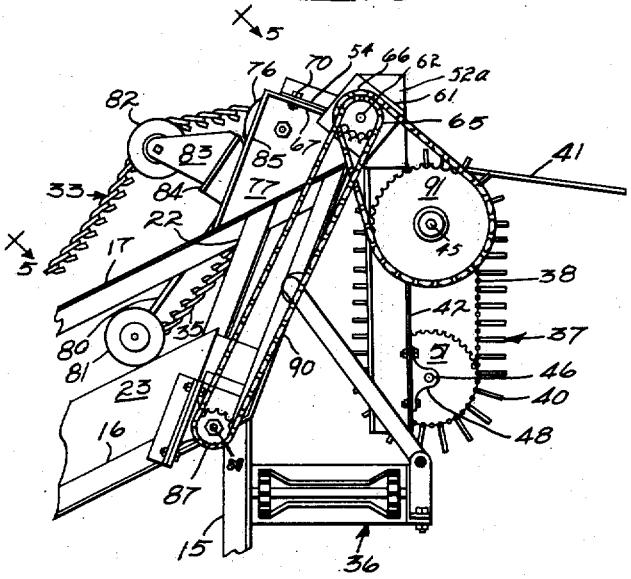
FIGURE 3 is an enlarged fragmentary side view of the vine remover showing the draper conveyor and the vine remover, both raised from normal positions.
Figure 4:
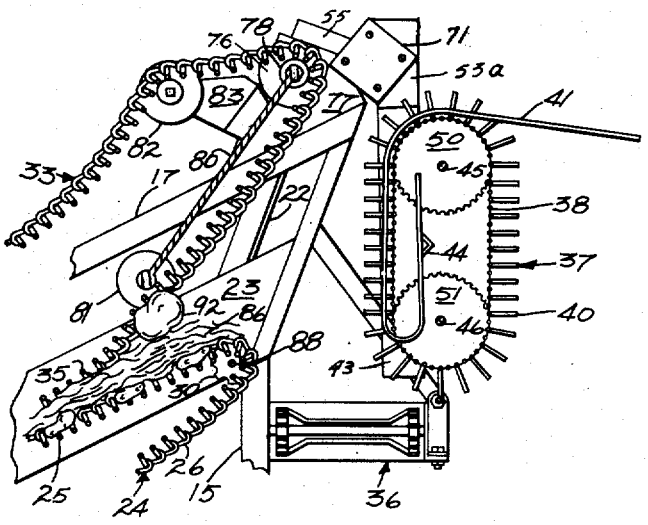
FIGURE 4 is a vertical sectional view taken through the center of FIGURE 3.
Figure 5:
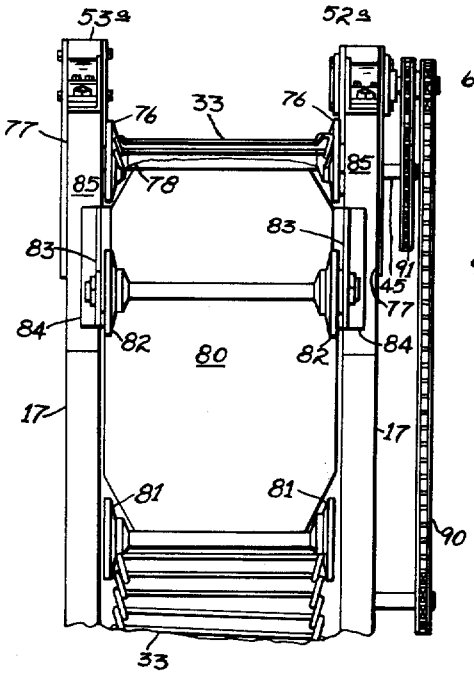
FIGURE 5 is a view taken along line 5—5 in FIGURE 3 with portions of the draper conveyor removed.
Figure 6:
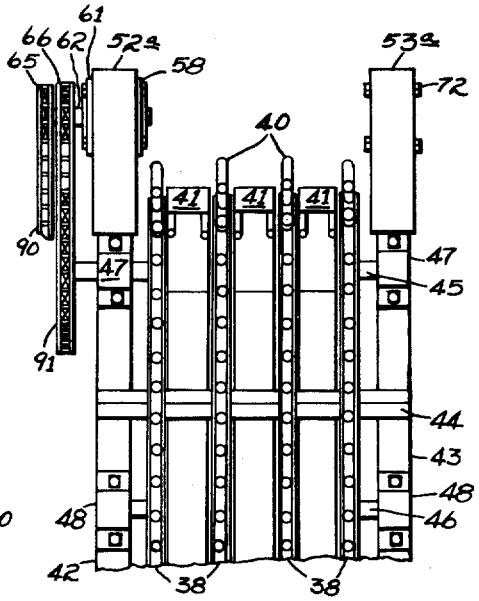
FIGURE 6 is a view of the vine remover conveyor assembly taken from the right hand end of FIGURE 3.

Thus, the only connection between the main frame 10 and the auxiliary frame is through the sleeves 57 and 71. The auxiliary frame can easily be removed for repairs or replacement by release of straps 68 and 74. The sleeves 57, 71 are forwardly offset with respect to the vine removing conveyor 37 so that the weight of the auxiliary frame and the conveyor 37 normally holds the conveyor 37 in its operating position, shown in FIGURES 1 and 2. However, the auxiliary frame is free to swing outward, as illustrated in FIGURES 3 and 4, to clear any obstruction such as a rock. The forward pressure of the vine conveyor 37 depends on where you pivot it on the main frame 17.

The portion of draper conveyor 33 adjacent to the vine removing conveyor 37 is supported by a triangular series of three pairs of guiding and supporting rollers. The first set of rollers 76 is rotatably journalled between the supports 77 on the angle irons 17 adjacent the pivotal mounting of the vine remover auxiliary frame. Also rotatably mounted by and between the supports 77 is a support element 78. This element carries a flat plate 80 that extends downwardly to a location adjacent the upper end of the elevating conveyor 24. Rotatably journalled on the lower end of the plate 80 is the second pair of guide support rollers 81. Intermediate the two sets of rollers 76 and 81 is a third pair of guide support rollers 82. These rollers 82 are forwardly offset from plate 80. Each roller 82 is mounted individually on a plate 82 fastened to plate 80. The plate 83 has an outwardly facing ledge 84 adapted to abut the forward face 85 of the adjacent support 77.

Figure 2:
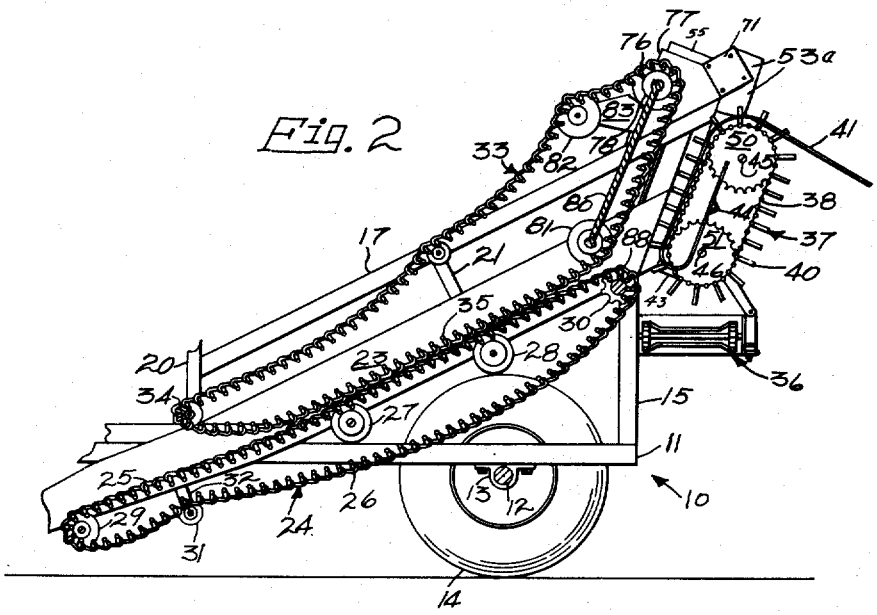
FIGURE 2 is a vertical sectional view taken through the center of FIGURE 1.

In normal use, the weight of draper conveyor 33 holds the plate 80 in the position illustrated in FIGURES 1 and 2 wherein the lower flight 35 of the draper conveyor 33 lies on the potatoes on the elevating conveyor 24 and the rear portion of the draper conveyor lies close to the vine removing conveyor to hold the materials on each of these conveyors. However, should a large obstacle, such as a rock 92 entangled in a mass of vines 85 (FIGURE 4) be carried on flight 25, the rollers 81 can rise by movement of the plate 80 about its pivotal connection at 78 to frame 10. The rollers 82 are moved up by movement of the plate 80 and take up the slack in the conveyor 33 and provide downward push to urge the plate 80 to its normal position after the obstacle has passed.

The pressure of the vine removing conveyor toward the upper end of the elevating conveyor chain and the draper conveyor chain is dependent upon how far forward the pivot sleeves 57 and 71 are placed. Yet the vine remover and the draper conveyor are both free to move away from obstructions without breaking anything.

The driving connections for the conveyors are quite simple. Conveyors 24 and 33 are driven by their conventional apparatus. A sprocket 87 fixed to the upper shaft 88 on conveyor 24 drives a chain 90 which in turn drives the outer sprocket 65 on the shaft 62. The inner sprocket 66 on the shaft 62 in turn drives a sprocket 91 on the top shaft 45 of conveyor 37 to drive the conveyor 37.

Thus, the present invention provides a protective mounting apparatus for the draper conveyor 33 and for the vine carrying conveyor 37 and also a structure that can easily be disassembled for repair purposes. It is quite obvious that various mechanical equivalents can be substituted in the described machine without leaving the scope of this invention. Therefore only the following claims are intended to limit and define the invention.

Having thus described my invention, I claim:

1. A vine removing apparatus adapted for use on a potato harvester having a rigid conveyor frame, an elevating conveyor mounted on said conveyor frame, and a draper conveyor mounted on said conveyor frame above and directly adjacent to said elevating conveyor, comprising a vine removing conveyor pivotally mounted on said conveyor frame about a transverse axis offset from the path of said vine [remover] *removing* conveyor, said draper conveyor including a continuous extension positioned parallel to and adjacent the normal location of said vine removing conveyor, a set of movably mounted rollers carried by said frame adjacent the upper end of said elevating conveyor adapted to guide said draper conveyor, said draper conveyor being supported at its upper end by a second set of rollers rotatably journalled on said conveyor frame, a rigid support element pivoted coaxially with said second set of rollers, said movably mounted rollers being rotatably journalled on said rigid support element, and a third set of rollers rotatably journalled on said rigid support element and offset from the plane containing the axes of the preceding two sets of rollers.

2. [A vine removing apparatus adapted for use with a potato harvester having a rigid conveyor frame, an elevating conveyor mounted on said conveyor frame having a top flight extending upwardly and rearwardly to a loading position, comprising a support element, said support element being pivotally connected to said frame about a transverse horizontal axis offset from the main body of said support element, a vine carrying conveyor mounted on said support element and extending to a position adjacent the loading position of said elevating conveyor, a draper conveyor mounted on said frame having a lower flight adjacent the upper flight of said elevating conveyor and the forward flight of said vine carrying conveyor, the draper conveyor extending about a triangular configuration of three sets of roller supports, the first set of said rollers being rotatably journalled on said conveyor frame adjacent the pivotal connection of said support element and frame, a carrier element rotatably journalled by said frame coaxially with said first set of rollers, the second set of said rollers being rotatably journalled on said carrier element adjacent the loading position of said elevating conveyor, the third set of said rollers being rotatably journalled on said carrier element and offset forwardly from the first set of said rollers and above the second set of said rollers,] *In a vine removing apparatus, the com-*

*bination with an elevating conveyor having an upper flight extending upwardly and rearwardly from a potato delivery area to a loading area, and a main frame carrying said elevating conveyor; of a vine carrying conveyor, an auxiliary frame for said vine carrying conveyor having a forwardly offset pivotal connection to said main frame above and rearward of the upper end of said elevating conveyor, said vine carrying conveyor including a forward flight extending downwardly to an area adjacent the upper end of said elevating conveyor, and draper conveyor means located on said main frame having a portion adjacent to and overlying the upper flight of said elevating conveyor and an upwardly directed portion alongside the forward flight of said vine carrying conveyor,* said draper conveyor *means* comprising a continuous conveyor, the upper end of said conveyor being supported and guided by three sets of conveyor guide rollers, the uppermost set of conveyor guide rollers being mounted on said main frame adjacent the pivotal connection of the main frame and auxiliary frame, a support element pivotally joined to said frame coaxially with said uppermost rollers and extending downwardly to a location directly adjacent to the upper end of said elevating conveyor, a second set of conveyor guide rollers rotatably journalled at the lower end of said support element, and a third set of conveyor guide rollers rotatably journalled on said support element intermediate the preceding two sets and forwardly offset from a plane containing the axes of the preceding two sets.

3. A vine removing apparatus adapted for use with a potato harvester having a rigid conveyor frame, an elevating conveyor mounted on said conveyor frame having a top flight extending upwardly and rearwardly to a loading position, comprising a support element, said support element being pivotally connected to said frame about a transverse horizontal axis offset from the main body of said support element, a vine carrying conveyor mounted on said support element and extending to a position adjacent the loading position of said elevating conveyor, a draper conveyor mounted on said frame having a lower flight adjacent the upper flight of said elevating conveyor and the forward flight of said vine carrying conveyor, the draper conveyor extending about a triangular configuration of three sets of [roller supports] *rollers,* the first set of said rollers being rotatably journalled on said conveyor frame adjacent the pivotal connection of said support element and frame, a carrier element rotatably journalled by said frame coaxially with said first set of rollers, the second set of said rollers being rotatably journalled on said carrier element adjacent the loading position of said elevating conveyor, and the third set of said rollers being rotatably journalled on said carrier element and offset forwardly from the first set of said rollers and above the second set of said rollers.

References Cited by the Examiner

The following references, cited by the Examiner, are of record in the patented file of this patent or the original patent.

UNITED STATES PATENTS

| | | | |
|---|---|---|---|
| 1,130,403 | 3/15 | Hoover | 130—30 |
| 2,425,476 | 8/47 | Lade et al. | 74—242.1 XR |
| 2,789,438 | 4/57 | Hutchinson | 74—242.1 |
| 2,828,825 | 4/58 | Johnson | 171—118 |

T. GRAHAM CRAVER, *Primary Examiner.*